Figure 1:
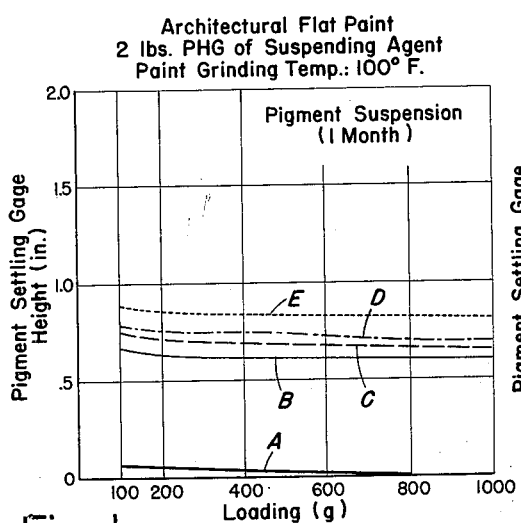

March 3, 1964          W. LINDLAW          3,123,488

SUSPENSIONS OF PIGMENTS AND OTHER PARTICLES

Filed June 11, 1959          2 Sheets—Sheet 1

——— A = Suspending Agent of Invention
——— B = Hydrogenated Castor Oil
- - - - C = Aluminum Distearate
-·-·-· D = Organic Montmorillonite Derivative
········ E = Control (no suspending agent)

INVENTOR
William Lindlaw
BY Willard R. Sprowls
ATTORNEY

March 3, 1964 W. LINDLAW 3,123,488
SUSPENSIONS OF PIGMENTS AND OTHER PARTICLES
Filed June 11, 1959 2 Sheets-Sheet 2

———————— A = Suspending Agent of Invention
———————— B = Hydrogenated Castor Oil
— — — — — C = Aluminum Distearate
—··—··—··— D = Organic Montmorillonite Derivative
··············· E = Control (no suspending agent)
— — — — — F = Aluminum Di-(hydroxystearate)

INVENTOR
William Lindlaw
BY Willard R. Sprowls
ATTORNEY

United States Patent Office 3,123,488
Patented Mar. 3, 1964

3,123,488
SUSPENSIONS OF PIGMENTS AND OTHER PARTICLES
William Lindlaw, 165 Landsdowne Ave., Westfield, N.J.
Filed June 11, 1959, Ser. No. 820,073
12 Claims. (Cl. 106—268)

This application is a continuation-in-part of my abandoned copending application Serial No. 607,643, filed September 14, 1956.

This invention relates to suspensions of pigments and other particles, to a process for the production of such suspensions, and to the rheological-property-modifying and suspending agents contained therein. The rheological-property-modifying and suspending agents of this invention are characterized by having many advantageous properties, but especially that of stability at elevated processing temperatures.

Previously available rheological-property-modifying and suspending agents have possessed various defects which are overcome by the agents of this invention. Thus, aluminum stearate is notably deficient in its ability to maintain pigments in suspension in most organic vehicles and in the case with which pigments can be redispersed after settling from such suspensions during long periods of aging. The gel produced by the incorporation of aluminum stearate in organic vehicles is of a rubbery type, rather than the desirable thixotropic type of gel which is effective in maintaining stable suspensions. The presence of aluminum stearate in pigment suspensions, such as paints, has no beneficial effect on the brushability properties of such suspensions. Organic derivatives of montmorillonite have also been used as suspending agents. However, such derivatives are effective only in the presence of aromatic and polar solvents and, consequently, are inefficient when incorporated in the presently favored odorless, aliphatic hydrocarbon vehicles. Hydrogenated castor oil is a much more efficient suspending agent than the indicated montmorillonite derivatives, and is suitable for use in aliphatic hydrocarbon vehicles. However, hydrogenated castor oil has the disadvantage of being unstable at the elevated temperatures used in the processing of suspensions, e.g., in paint mills with the result that there is seeding or the formation of small grains in such suspensions; this lack of smoothness is highly undesirable in most suspensions, including those used in the protective coating and ink fields. Polyethylene has also been tried as a suspending agent, but it, too, has its drawbacks in this regard. For example, paints containing polyethylene as a suspending agent are characterized by settling of the pigment contained therein within a few days, have poor anti-sag properties, and display little or no puff during the initial milling of the paint constituents or thereafter; "puff" refers to the desirable blown-up appearance of paint indicative of a good dispersion, and resembling whipped cream in appearance. It is thus evident that no prior art rheological-property-modifying and suspending agent has been completely satisfactory or effective.

An object of this invention is to provide a heat-stable composition for use in modifying the rheological and suspension properties of non-aqueous fluid systems containing finely divided solid particles. Another object is to provide a process for the production of suspensions of finely divided solid particles in non-aqueous fluid systems by the use of the aforesaid heat-stable compositions. Still another object is the provision of stable suspensions of finely divided solid particles in organic liquid vehicles.

These and other objects of the invention will become apparent from the following more complete description thereof.

These emulsifiable polyethylene waxes should have a molecular weight of from about 1500 to about 6000, the preferred range being about 2000 to about 2500, and should have an acid number of from about 2 to about 50, the range of about 7 to about 50 being particularly effective. Polyethylenes of lower and higher molecular weights do not exhibit the suspension properties which characterize the polyethylenes of this invention. These emulsifiable polyethylene waxes are effective at very low concentrations which are lower than those required for prior art additives, as the instant additives can suitably be used in amounts as low as about 1 pound per 100 gallons of total composition; the effective upper limit on additive usage is about 30 pounds per 100 gallons of total composition. Among the desirable properties contributed by these polyethylenes are: effective pigment suspension; good anti-sag properties; thixotropic body; good brushability; controlled penetration of the finished compositions; and excellent heat stability.

Organic liquid vehicles for use in the production of dispersions of the instant emulsifiable polyethylene waxes include hydrocarbons, these being the preferred organic fluids; halogenated hydrocarbons; ketones; ethers and polyethers; esters; ether-alcohols; alcohols and polyols. Typical suitable organic fluids include aliphatic, cycloaliphatic, aromatic, and terpene hydrocarbons, such as n-heptane, petroleum naphtha, mineral spirits, cyclohexane, benzene, toluene, p-xylene, cis-decalin, tetralin, alpha-pinene, dipentene, and p-cymene; halogenated compounds, such as trichloroethylene, n-amyl chloride, perchloroethylene, 2-ethylhexyl chloride, chlorobenzene, o-chlorotoluene, o-dichlorobenzene, and dichloroethyl ether; ketones, such as acetone, methyl ethyl ketone, diethyl ketone, methyl n-propyl ketone, methyl i-butyl ketone, mesityl oxide, ethyl n-butyl ketone, diacetone alcohol, cyclohexanone, acetophenone, isophorone, and d-fenchone; ethers and polyethers, such as ethyl n-butyl ether, glycol diethyl ether, diethylene glycol diethyl ether, 1,4-dioxane, and tetrahydrofurane; esters, such as ethyl acetate, i-butyl acetate, 2-methoxyethyl acetate, ethyl lactate, n-butyl lactate, diethyl oxalate, ethylene glycol diacetate, and gammavalerolactone; ether alcohols, such as 2-methoxyethanol, methoxymethoxyethanol, diethylene glycol monoethyl ether, and diethylene glycol monobutyl ether; and alcohols and polyols, such as ethyl alcohol, i-amyl alcohol, n-heptyl alcohol, di-i-butyl carbinol, methylphenyl carbinol, cyclohexanol, furfuryl alcohol, tetrahydrofurfuryl alcohol, benzyl alcohol, propylene glycol, 1,3-butanediol, and glycerol. The amount of the organic liquid vehicle to be used in the formation of the dispersion suitably ranges from about 40 to about 95 weight percent, based on the weight of the dispersion.

As regards the finely divided solid particles to be suspended by the agents of this invention, the particles should be of colloidal or greater size, and should be substantially insoluble in the medium in which they are suspended. There is no particular upper limit on particle size, but the size should be such that the particles are capable of being suspended in the selected medium. The solid particles may be pigments, inerts, fillers, reflecting agents, etc.

The emulsifiable polyethylene waxes are most effective when utilized for the purposes of this invention in finely divided form. A preferred technique for getting the emulsifiable polyethylene wax into finely divided form involves dispersing the wax in an organic liquid vehicle at a temperature of about 200°–220° F. The resulting dispersion can be cooled with or without agitation; if no agitation is used, a homogeneous product is obtained. It has been found that a superior product results when the cooling is quite rapid. The resulting colloidal dispersion is the preferred form in which the suspending agent of this invention is utilized. However, any technique for the preparation of the emulsifiable polyethylene wax in finely divided form will yield a product which gives satisfactory results as a suspending agent. Good results are achieved when the indicated colloidal dispersion contains from about 10 to about 60 weight percent of the emulsifiable polyethylene wax, while, normally, optimum effects are achieved when the said wax content of the dispersion is on the order of about 40 weight percent.

Without being limited by the following explanation, it appears that the action of the suspending agent of this invention is dependent on the development of a thixotropic gel structure. Such a gel structure is presumably developed as a result of the limited swelling of the suspending agent of this invention in paint, ink, and similar vehicle systems in which it is incorporated. The action of this agent in vehicle systems can be visualized as the building up of a structure consisting of millions of discrete but interlocked particles of the emulsifiable polyethylene wax. This loosely-knit lattice structure apparently accounts for the advantages achieved by the use of the suspending agent of this invention. In other words, the presence of discrete particles in the suspending agent dispersion is critical, since solutions, regardless of their viscosity, are ineffective for the purpose of this invention.

As regards the manner of use of the suspending agent of this invention, it is normally incorporated into paint or other vehicle systems as part of the pigment or other solid particle grind. This preferred procedure is generally also the easiest, most efficient, and least expensive method for realizing the maximum benefits from this suspending agent. The grinding action is desirable primarily in order to achieve maximum separation of the polyethylene wax particles in the vehicles. It is only when the particles are completely dispersed that the optimum effects are attained.

To a major extent, the beneficial effects imparted by the suspending agent of this invention are a function of the temperature to which the agent is subjected during the production of the fine particle suspension. For greatest efficiency, a high processing temperature is desirable and should be used. Generally, the temperature during the grinding or other dispersing step should fall between about 130° and about 180° F. The maximum efficiency is attained at about 150° F., and, while higher grinding temperatures are satisfactory, little increase in efficiency results from their use.

Another advantage of the indicated high temperature processing is that the viscosity change of the resulting suspensions on aging is markedly lessened or avoided entirely thereby. If a suspension is produced at a temperature much below 130° F., such as 100° F., it is necessary to use more of the suspending agent of this invention to get the desired results, and the resulting suspension is apt to exhibit a viscosity drift over a period of a month or more. If the latter suspension is subjected during shelf storage to temperatures of about 110° F. or higher, undesirable viscosity increases are usually noted. On the other hand, suspensions prepared with the suspending agent of this invention at the indicated high temperatures and with effective grinding or other dispersing action reach stable viscosities almost immediately after their preparation.

The quantity of the suspending agent of this invention required to give satisfactory performance in a given medium depends on several factors, namely: the specific effect required (pigment suspension, anti-sag, etc.); the specific nature of the suspension (enamel, flat paint, etc.); the processing conditions under which the suspension is manufactured; the organic fluid system employed. Table I indicates satisfactory amounts of suspending agent for use in selected paint systems. These amounts are not limiting, since a change in conditions can result in a change in the optimum amount of suspending agent to be used.

TABLE I

*Amounts of Suspending Agent to be Used in Selected Paint Systems*

| Type of Paint | Temperature of Grind, °F. | Pounds of Agent per 100 gallons Required to Impart— | |
|---|---|---|---|
| | | Pigment Suspension | Non-Sag Properties |
| Architectural | 150 | 2–3 | 4–5 |
| White Enamel | 100 | 4 | 6–8 |
| Architectural | 150 | 2–3 | 5 |
| Flat Alkyd | 100 | 3–4 | 12–15 |
| Chlorinated Rubber | 150 | 4–5 | 7–10 |
| Alkyd Paint | 100 | 5–10 | 12–15 |

This table also brings out the point that larger quantities of the suspending agent are required to impart non-sag properties than are required to achieve fine particle suspension.

The uniqueness of carboxyl-containing ethylene polymers as effective suspending agents is attested to by the unsuccessful search for other materials having similar properties. Materials found to be unsatisfactory for the purposes of this invention include: ordinary polyethylenes; polyethylene glycols; cellulose esters and ethers; acrylic and methacrylic ester polymers and copolymers; vinyl chloride polymers and copolymers; polyvinyl butyral; polyamides; carnauba wax, aluminum distearate; and aluminum di(hydroxystearate). In general, all of the foregoing unsatisfactory materials proved unsuitable for the purposes of this invention because they were either too soluble in organic vehicles or formed too tough or rubbery a gel in such vehicles. As stated above, for the purposes of this invention, it is important that the suspending agent be available in the form of a thixotropic type of gel.

The effectiveness of the suspending agent of this invention and of other suspending agents was determined by their use in various paint and other formulations. In the normal paint formulation technique which was utilized, a stiff paste was first prepared by pre-mixing a portion of the vehicle, all of the pigment, and the suspending agent. This paste was ground on a 3-roll or other mill, and the ground effluent was let down with the remainder of the vehicle; the drier and anti-skinning agent were also added at this stage.

As regards the various tests which were performed on the finished paints and the like, the fineness of grind was determined by the use of a Hegman fineness gage. The gage readings run from 0 to 8, with 0 indicating a particle size of 4 mils or larger, while 8 represents maximum fineness. This determination was used as a means of demonstrating the heat stability characteristics of a paint or similar composition, since a considerable increase in particle size shows that such a composition is definitely unstable at the elevated test temperature.

The heating of the paint or other compositions was effected at various elevated temperatures, with the composition being placed in a can in an oven at the desired temperature for 7 days or until earlier heat stability failure of the paint was observed. After cooling of the composition, its appearance was observed both in the can and after a draw down, e.g., a 3 mil wet film, of the composition had been prepared on a standard hiding power chart by the use of a film applicator. Such observation readily revealed whether the composition had been adversely affected by its subjection to the elevated temperature.

The anti-sag test utilized herein involves the following procedure. The test paint or other composition is thoroughly agitated in a paint shaker to insure homogeneity. Thereafter, it is aged for 30 minutes to permit adequate recovery of any viscosity or yield value which may have been temporarily lowered due to the agitation. A representive sample of this composition (3–4 cc.) is puddled at the top of Morest Chart (Form 07, Blank White). A 2-inch wide applicator is used to draw down a film (3 mil wet film thickness) the length of the chart. Immediately after the draw-down is completed, two lines are drawn rapidly and completely across the film (with the Morest Chart resting on a flat surface) so as to give two paint-free bands for observation. A metal device known as a sag-liner is desirably used to draw bands having widths of approximately $1/32$ inch and $5/32$ inch, respectively. Immediately after these bands are drawn, the chart is hung in a vertical position, preferably in a constant temperature (room temperature) and humidity (50% relative humidity) room, for 24 hours or until dry. The films are then rated according to the following system:

No sag—those films which reveal no evidence whatsoever of paint movement during the 24-hour aging period for either sag line.

Very slight sag—those films where the paint runs part way across either sag line but fails to contact the other side.

Slight sag—those films where the paint runs completely across the narrower sag line at some point, but not completely across the broader sag line.

Sag—those films where some portion of the paint runs down and across both sag lines to touch and become continuous with the other side.

The following test is most useful in quantitatively evaluating the degree of pigment or other fine particle settling in paints or in other compositions during shelf storage. The pigment settling tester consists essentially of a tripod base supporting a central, vertical, tubular sleeve (carrying a graduated linear scale) through which runs a loose fitting plunger (¼ inch diameter). The bottom end of the plunger is fitted with a thin flat disc (1.5 inches in diameter) which is perforated concentrically with 4 holes (¼ inch diameter). The upper end of the plunger is fitted with a pan on which weights can be placed to exert a driving action on the plunger and perforated disc. By the use of this gage, it is possible to systematically probe the layering of pigment which may have settled to the bottom of a can of paint during a given time period. Because of the non-uniform nature of pigment settling, this test is performed in a stepwise fashion through an increase in loading a half-minute intervals. This loading process is continued until the disc touches and comes to rest on the bottom of the can or until the maximum loading of 1000 grams is reached with a layer of pigment still present which resists displacement. The test is run on a one-quart sample of the composition under test in a one-quart commercial paint container (4 inches in diameter and 4.5 inches in height). The paint gage scale is adjusted, with the tripod legs of the gage straddling an empty paint can and resting on the same plane surface on which the can is placed, so that the zero reading of the scale coincides with the position at which the perforated disc is touching the bottom of the can. In running the test, the tripod, with plunger assembly held high up in the tripod sleeve, is placed over the paint can (as described in connection with the scale adjustment). The plunger assembly is then gently lowered manually so that the perforated disc is immersed just below the surface of the paint. At this point, the plunger is released and a stop watch is started to time subsequent loading intervals. The pan at the top of the plunger is loaded according to the following schedule:

| Time (minutes) | Weight Added (grams) | Total Weight (grams) (including plunger assembly) |
|---|---|---|
| 0 | 0 | 100 |
| .5 | 100 | 200 |
| 1.0 | 200 | 400 |
| 1.5 | 200 | 600 |
| 2.0 | 200 | 800 |
| 2.5 | 200 | 1,000 |
| 3.0 | (end of test) | |

Readings from the graduated scale of the tubular sleeve (opposite the index line on the plunger rod) are taken immediately before each loading of the plunger pan and at the end of the test. A graphic plot of loading versus height of plunger disc above can bottom gives a good visual indication of the nature and degree of pigment settling. By the use of this gage, a layer of settled pigment 0.01 inch in thickness becomes measurable. The usual procedure is to run this test on paints or similar compositions which have been shelf aged at room temperature for 1 month from the time of preparation of the composition.

Detailed test data on the suspending agent of this invention and other suspending agents are presented below In Examples 1–3, the data for which are presented in Table II, the effects of using hydrogenated castor oil, ordinary polyethylene, and a carboxyl-containing ethylene polymer, respectively, in a paint formulation are demonstrated. The dispersions of the emulsifiable polyethylene wax in the aliphatic hydrocarbon solvent were prepared by heating the polymer in the solvent to 230° F., and then cooling. The hydrogenated castor oil was used in finely divided, solid form. As is demonstrated in Table II, hydrogenated castor oil is quite unsatisfactory as a suspending agent at elevated temperatures. Since much of the commercial paint processing equipment normally produces such temperatures in the paint being processed, it is essential that the suspending agent be capable of producing a heat stable suspension.

TABLE II

*Emulsifiable Polyethylene Wax vs. Hydrogenated Castor Oil and Polyethylene*

| Paint Formulations | Example 1 | Example 2 | Example 3 |
|---|---|---|---|
| Extended TiO₂ (35% rutile TiO₂; 65% CaSO₄). | 125 g | 125 g | 125 g. |
| Rutile TiO₂ | 125 g | 125 g | 125 g. |
| Alkyd Enamel Vehicle (60% solids). | 304 g | 304 g | 304g |
| Mineral Spirits | 60 g | 58 g | 58 g. |
| Hydrogenated Castor Oil 96% through #325 screen) | 2 g | 0 g | 0 g. |
| Polyethylene ¹ (50% in mineral spirits) | 0 g | 0 g | 4 g. |
| Emulsifiable Polyethylene Wax ² (50% in mineral spirits). | 0 g | 4 g | 0 g. |
| Cobalt naphthenate | 1 cc | 1 cc | 1 cc. |
| Lead naphthenate | 2 cc | 2 cc | 2 cc. |
| Anti-skinning agent | 1 cc | 1 cc | 1 cc. |
| Testing: | | | |
| Fineness of Grind-as made (100° F.). | 7 | 7 | 6½+. |
| 130° F | 7 | 7 | |
| 133° F | 2 | 7 | 6½+. |
| 147° F | 0 | 7 | |
| Heat Test—133° F.: | | | |
| Appearance | Watery and seedy. | Smooth and creamy. | |
| Draw-downs | Flat and very seedy. | Very glossy and smooth. | Poor sag. |
| Heat Test—150 F.: | | | |
| Appearance | | No seeding | |
| Draw-down | | Glossy and smooth. | |

¹ Mol. wt.: ca. 2000; acid No.: 0.
² Mol. wt.: ca. 2000; acid No.: 14–17.

The polyethylene containing paint (Example 3) proved to be unsatisfactory, since, on the heat test, the draw-down showed poor sag properties; this same condition was also observed in draw-downs prepared on the Example 3 paint before it was subjected to the heat test. The Example 2 data on the suspending agent of this invention show that it was completely satisfactory under all of the test conditions.

In Table III, data are presented on paint formulations containing the suspending agent of this invention and hydrogenated castor oil, respectively, in an aromatic vehicle. The dispersions of the emulsifiable polyethylene wax in xylol were prepared in the same manner as the dispersion of Example 2.

TABLE III
*Emulsifiable Polyethylene Wax vs. Hydrogenated Castor Oil—Aromatic Vehicle*

| Paint Formulations | Example 4 | Example 5 | Example 6 |
|---|---|---|---|
| Rutile TiO$_2$ | 200 g | 200 g | 200 g. |
| Chlorinated Natural Rubber (40%), 20 cps. viscosity | 100 g | 100 g | 100 g. |
| Dehydrated Castor Oil (55%) Alkyd (70% solids in xylol) | 230 g | 230 g | 230 g. |
| Xylol | 130 g | 128 g | 128 g. |
| Hydrogenated Castor Oil (96% through #325 screen) | 2 g | 0 g | 0 g. |
| Emulsifiable Polyethylene Wax [1] (50% in xylol) | 0 g | 4 g | 0 g. |
| Emulsifiable Polyethylene Wax [1] (40% in xylol) | 0 g | 0 g | 5 g. |
| Cobalt naphthenate | 1.6 cc | 1.6 cc | 1.6 cc. |
| Lead naphthenate | 3.2 cc | 3.2 cc | 3.2 cc. |
| Testing: | | | |
| Fineness of Grind-as made (100° F.) | 7 | 7 | 7+. |
| 147° F | 0 | 7 | |
| 168° F | | | 7+. |
| Heat Test—162°–168° F.: | | | |
| Draw-downs | Seedy and flat. | Glossy; no sag. | Glossy; no sag. |

[1] Mol. wt.: ca. 2000; acid No.: 14–17.

Again, in the presence of the aromatic vehicle, the suspending agent of this invention (Examples 5 and 6) shows up completely satisfactorily in the heat stability tests at 147° F. and 162°–168° F. On the contrary, the paint containing hydrogenated castor oil (Example 4) developed seeding and a flat appearance as a result of the heat stability testing.

Data are presented in Table IV on the effect of using elevated temperature during paint formulation processing, the temperatures being similar to those encountered in industrial operations. The particular paint used in these examples is a semi-gloss formulation. It will again be noted that the paint containing the hydrogenated oil developes objectionable seeding at the elevated processing temperature, and the paint containing no suspending agent developed hard settling of the pigment, while the paint containing the suspending agent of this invention is completely satisfactory.

TABLE IV
*Emulsifiable Polyethylene Wax vs. Hydrogenated Castor Oil Use of Elevated Temperature in Paint Processing*

| Paint Formulation | Example 7 | Example 8 | Example 9 |
|---|---|---|---|
| Rutile TiO$_2$ | 350 g | 350 g | 350 g. |
| Calcium Carbonate | 175 g | 175 g | 175 g. |
| Diatomaceous Earth | 35 g | 35 g | 35 g. |
| Soy Alkyd (70% solids) (per Govt. Specif. 52-R-13) | 396 g | 369 g | 396 g. |
| Mineral Spirits | 200 g | 200 g | 200 g. |
| Hydrogenated Castor Oil (96% through #325 screen) | 0 g | 4 g | 0 g. |
| Emulsifiable Polyethylene Wax [1] (40% in mineral spirits) | 0 g | 0 g | 10 g. |
| Cobalt naphthenate | 2 cc | 2 cc | 2 cc. |
| Lead naphthenate | 3 cc | 3 cc | 3 cc. |
| Anti-skinning agent | 1 cc | 1 cc | 1 cc. |
| Temperature on 3rd pass through heated Morehouse mill, ° F. | 154 | 150 | 162. |
| Testing (after overnight cooling): | | | |
| Fineness of Grind | 6 | 0 | 5. |
| Appearance | Hard Settling. | Very viscous and seedy. | Good puff and smooth. |

[1] Mol. wt.: ca. 2000 acid No.: 14–17.

In Table V, data are presented on paint formulations containing the suspending agent of this invention as well as on formulations containing other materials showing promise in an initial screening test. It will be noted that the suspending agent of this invention (Examples 10–13) gave desirable results. The non-water-emulsifiable polyethylene (Examples 14–17) was not satisfactory, as the desired puff was not obtained, and the sagging and settling properties were unsuitable. The paint prepared with carnauba wax (Example 18) was unsatisfactory as regards puff and sagging. The properties of the other two paints in this series (Examples 19 and 20) also left something to be desired. The lack of certain entries in the "Settling" column in Table V indicates that no observation of this property was made.

TABLE V
*Emulsifiable Polyethylene Wax vs. Materials Showing Promise in Initial Screening Test*

| Example | Suspending Agent | Observations During Milling | Product Testing | |
|---|---|---|---|---|
| | | | Sag | Settling (3 days) |
| No. 10 | Emulsifiable Polyethylene Wax [1] | Good puff | No sag | No settling. |
| No. 11 | do | do | do | Do. |
| No. 12 | do | do | do | |
| No. 13 | do | do | do | |
| No. 14 | Polyethylene [5] | No puff | Bad sag | Settling. |
| No. 15 | do [6] | do | do | Slight Settling. |
| No. 16 | do [7] | do | Poor sag | |
| No. 17 | do [8] | do | do | |
| No. 18 | Carnauba wax | Slight puff | Bad sag | No settling. |
| No. 19 | Al di-stearate | Good puff [9] | do | |
| No. 20 | Ethylene diamine bis stearamide | No puff | Poor sag | |

[1] Mol. wt.: ca. 2000; acid No.: 14–17.
[2] Mol. wt.: ca. 2500; acid No.: 7–13.
[3] Mol. wt.: ca. 2000; acid No.: 25–35.
[4] Mol. wt.: ca. 2000; acid No.: 40–50.
[5] Mol. wt.: ca. 2500; acid No.: 0.
[6] Mol. wt.: ca. 2000; acid No.: 0.
[7] Mol. wt.: ca. 7000; acid No.: 0.
[8] Mol. wt.: ca. 12,000; acid No.: 0.
[9] Very difficult to let down the initial stiff paste through addition of remainder of vehicle.

NOTE.—The paints of Examples 10–20 correspond to the following formulation:

| | |
|---|---|
| Extended TiO$_2$ (35% rutile TiO$_2$; 65% CaSO$_4$) | g 125 |
| Rutile TiO$_2$ | g 125 |
| Soy Alkyd (70% solids) (per Govt. Spec. 52-R-13) | g 260 |
| Mineral spirits | g 101 |
| Suspending Agent (40% dispersion in mineral spirits; prepared by heating until clear solution obtained) | g 5 |
| Cobalt naphthenate | cc 1 |
| Lead naphthenate | cc 2 |
| Anti-skinning agent | cc 1 |

EXAMPLE 21

A series of data was obtained on architectural flat paint formulations containing various suspending agents. The standard formulation used for this purpose was as follows:

| | | |
|---|---|---|
| Rutile TiO$_2$ | g | 200 |
| Calcium carbonate | g | 250 |
| Calcium carbonate (wet processes: low oil absorption) | g | 200 |
| Drying oil flat alkyd | g | 414 |
| Mineral spirits | g | 115 |
| Cobalt naphthenate | cc | 1 |
| Lead naphthenate | cc | 2 |
| Anti-skinning agent | cc | 2 |
| Suspending agent | g | 2 or 4 |

The suspending agents tested in this formulation were: hydrogenated castor oil (96% through #325 screen); an organic montmorillonite derivative; aluminum distearate; and the suspending agent of this invention, consisting of 80% emulsifiable polyethylene wax (molecular weight: ca. 2000; acid No.: 14–17) and 20% diluents. The suspending agent of this invention was used as a 40% dispersion in mineral spirits, so that the amount of the active agent was 32% of that used in the case of other suspending agents.

Figure 2:
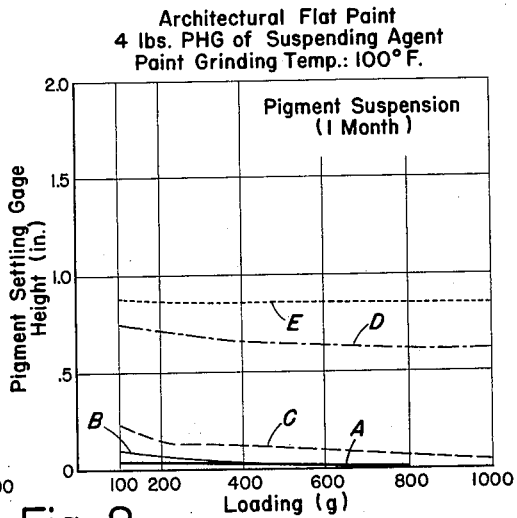
Figure 3:
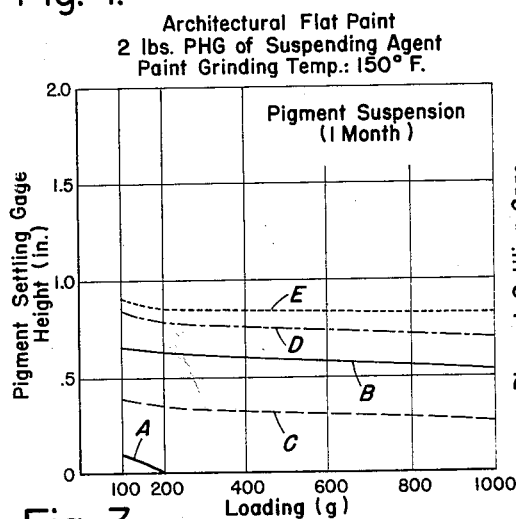
Figure 4:
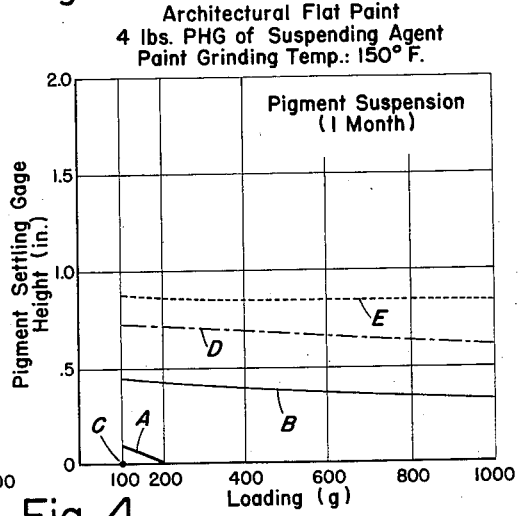

The data obtained are presented in the accompanying drawings. The pigment suspension data were obtained by the use of the pigment settling gage described above. The pigment suspension data of FIGURE 1 were obtained with the use of 2 g. of suspending agent in the above formulation, the paints being prepared at a grinding temperature of 100° F. It will be noted that the paints containing the suspending agent of this invention permitted the settling of the gage to the bottom of the container with a loading of 800 grams. With the other test paints, the gage settled to a height of from 0.6 to 6.7 inch from the bottom of the container, indicating that the pigment had packed in a thick, hard layer at the bottom of the container, and that redispersion of the pigment would create a difficult problem. FIGURE 2 shows that, when the amount of suspending agent in the above formulation was doubled to 4 g., the suspending agent of this invention retained its advantage over aluminum distearate and the montmorillonite derivative, there being a hard layer of pigment at the bottom of the container in the case of both of the latter suspending agents. FIGURE 3 shows that the effectiveness of the suspending agent of this invention was increased when the grinding temperature was 150° F., the data in this figure have been obtained on formulations containing 2 g. of the suspending agent. Only a 200 gram loading was required for the gage to reach the bottom of the container in the case of the suspending agent of this invention, while, at full loading, the gage was from 0.25 to 0.7 inch from the bottom of the container in the case of the other suspending agents. FIGURE 4 presents the data on the formulation containing 4 g. of suspending agent and prepared at a grinding temperature of 150° F. It will be noted that the suspending agent of this invention continues to show marked superiority over the hydrogenated castor oil and montmorillonite derivative. The anti-sag properties of the latter set of paints were also determined: draw-downs prepared after the paint had aged 30 days shows no sag for the paints containing the suspending agent of this invention and hydrogenated castor oil, respectively, very slight sag for the aluminum distearate paint, and sag for the montmorillonite derivative paint.

EXAMPLE 22

The suspending agents tested in Example 21 were also tested in an architectural enamel having the following formulation:

| | | |
|---|---|---|
| Extended TiO$_2$ (35% rutile TiO$_2$; 65% CaSO$_4$) | g | 250 |
| Rutile TiO$_2$ | g | 250 |
| Soy Alkyd (70% solids) (per Govt. Specif. 52–R–13) | g | 520 |
| Mineral spirits | g | 208 |
| Cobalt naphthenate | cc | 2 |
| Lead naphthenate | cc | 4 |
| Anti-skinning agent | cc | 1 |
| Suspending agent | g | 4 |

Figure 5:
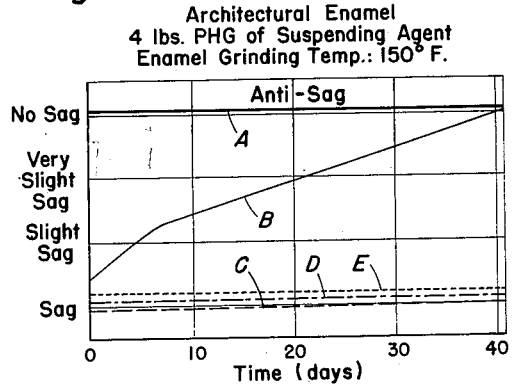

The paints containing the several additives were prepared at a grinding temperature of 150° F. The anti-sag properties were determined on this series of paints, and are presented in FIGURE 5. It is to be noted that the suspending agent of this invention gives paint films characterized by freedom from sag even without any aging of the paint. Paint films having similar characteristics are obtained in the case of the hydrogenated castor oil paint after it has aged for 40 days, while paint films prepared from the other formulations sagged throughout the test period.

The suspending agents tested in Example 21 were also tested in a chlorinated rubber alkyd fire retardant paint having the following formulation:

| | | |
|---|---|---|
| Extended TiO$_2$ (35% rutile TiO$_2$; 65% CaSO$_4$) | g | 230 |
| Rutile TiO$_2$ | g | 165 |
| Lamp black (blue tone) | g | 3 |
| Yellow iron oxide | g | 16 |
| Alkyd (60% solids; per Govt. Specif. 52–R–13) | g | 240 |
| Chlorinated natural rubber (40% in xylol) 10 cps. viscosity | g | 185 |
| Turpentine | g | 180 |
| Xylol | g | 75 |
| Cobalt naphthenate | cc | 1.58 |
| Epichlorohydrin | g | 0.4 |
| Anti-skinning agent | cc | 1 |
| Suspending agent | g | 5 or 10 |

Figure 6:
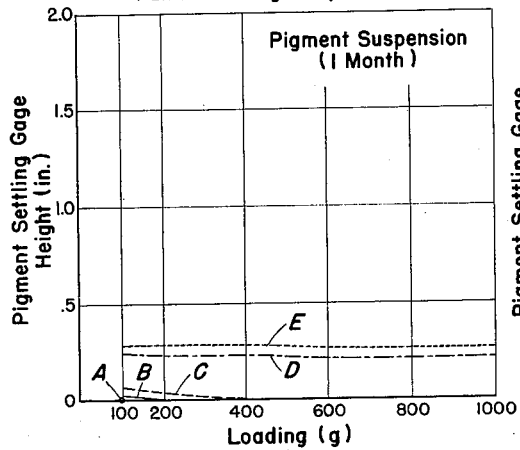
Figure 7:
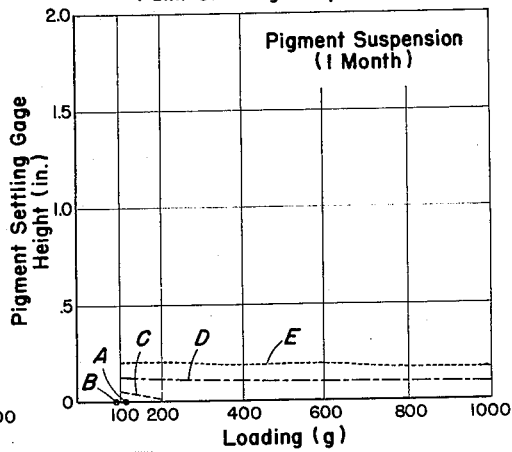

These paints were prepared at a grinding temperature of 150° F. FIGURE 6 shows the pigment suspension results obtained on formulations containing 5 g. of the suspending agent. It will be noted that the suspending agent of this invention gives optimum results, as the gage settled to the bottom of the container with only a 100 gram weight. The montmorillonite derivative paint showed hard settling of the pigment on this test, while the paints containing the other suspending agents gave intermediate results on the this test. FIGURE 7 shows the pigment suspension data on paints containing 10 g. of the suspending agent in the above formulation. Again, the suspending agent of this invention gave optimum results, while the montmorillonite derivative showed hard settling and pigment flooding (i.e., non-uniform color development due to differential separation of the dispersed pigment mixture). It is of interest that the viscosity of these paints, except for the hydrogenated castor oil paint, ranged from 66 to 72 Krebs units; in the case of the hydrogenated castor oil paint, the viscosity was an unsatisfactory value of 100+ Krebs units. Similarly, on the fineness of grind determination, all of the paints, except for the hydrogenated castor oil paint, gave readings of from 5 to 5.5; in the case of hydrogenated castor oil paint, the reading was about 0.1. As regards anti-sag properties, the paints containing the suspending agent of this invention and hydrogenated castor oil showed no sag when the paints had aged for 7 days; the other paints in this series sagged after the same period of aging. Thus, the suspending agent of this invention shows the best all-around properties of any of the suspending agents tested in the formulation of this example.

EXAMPLE 23

The suspending agents tested in Example 21 were also tested in an outside white house paint having the following formulation:

| | |
|---|---|
| Antase TiO₂ ------g-- | 100 |
| Rutile TiO₂ ------g-- | 100 |
| ZnO (leaded with 34–38% PbSO₄—PbO) ------g-- | 150 |
| CaCO₃ (wet processed; low oil absorption) ------g-- | 600 |
| Linseed oil ------g-- | 265 |
| Dehydrated castor oil (Z3 viscosity) ------g-- | 135 |
| Mineral spirits ------g-- | 110 |
| Lead naphthenate ------cc-- | 8 |
| Manganese naphthenate ------cc-- | 1 |
| Anti-skinning agent ------cc-- | 1 |
| Suspending agent ------g-- | 3 |

Figure 8:
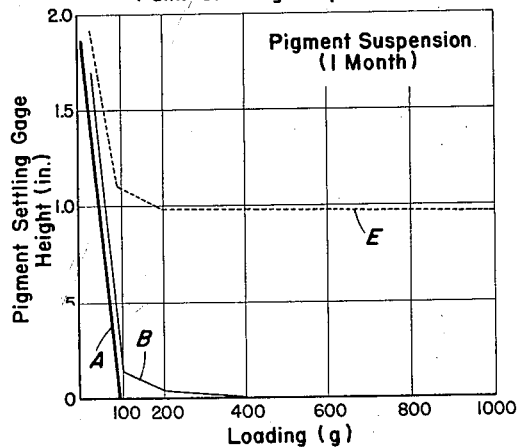

The grinding temperature used in the preparation of these paints was 150° F. FIGURE 8 shows the pigment suspension data obtained on paints containing the suspending agent of this invention and hydrogenated castor oil, respectively. It will be noted that optimum results were attained in the case of the paint containing the suspending agent of this invention. As regards the fineness of grind data, the value obtained for the paint containing the suspending agent of this invention was 4, which is quite satisfactory for paints of this type, while the value for the hydrogenated castor oil paint was 0. Both of these paints showed no sag in the test run to determine the anti-sag properties. The other Example 21 suspending agents, namely, aluminum distearate and the organic montmorillonite derivative, failed in this paint system as regards pigment suspension and anti-sag properties.

EXAMPLE 24

The suspending agents of Example 21, with the exception that aluminum di-(hydroxystearate) was substituted for the organic montmorillonite derivative, were also tested in a polyvinyl butyral wash primer having the following formulations:

| | G. |
|---|---|
| Zinc chromate | 54 |
| Magnesium silicate | 8 |
| Lamp black (blue tone) | 16 |
| Polyvinyl butyral | 56 |
| Butyl alcohol | 125 |
| Ethyl alcohol | 380 |
| Suspending agent | 16 |

Figure 9:
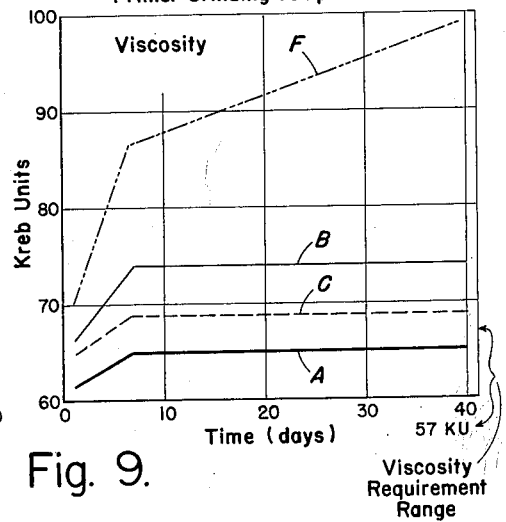

The grinding temperature used in the preparation of these primers was 85° F. As regards pigment suspension properties, all of the agents were satisfactory, with the exception of the aluminum distearate, which gave bad flooding. All of the agents were comparable on the fineness of grind determinations, and anti-sag properties are not a factor in this type of formulation. As shown by FIGURE 9, a significant variation between the suspending agents shows up in the viscosity determination. The suspending agent of this invention is the only agent which formed a paint having a viscosity in the required low viscosity range for this type of formulation.

The foregoing results were obtained by the use of emulsifiable polyethylene waxes as the suspending agent of this invention. Similar excellent results have been observed in the case of the above enumerated carboxyl-containing ethylene polymers other than oxidized polyethylene, and in the case of carboxyl-containing ethylene polymers having molecular weights as low as 1500 and as high as 6000, and having acid numbers as low as 2, the preferred range of molecular weights being between about 2000 and about 2500.

In addition to their use in formulations of the foregoing types, the suspending agents of this invention have been used successfully in minor amounts (0.2 to 0.5% by weight) in calk formulations (a) to inhibit any tendency towards bleeding of or staining by the calk compound, (b) to shorten the calk body and thereby avoid "stringiness," and (c) to prevent sagging and slumping. The thixotropic body imparted by the suspending agents of this invention to the calk also produces excellent "gunning" properties, so that the calk extrudes from the gun with ease. The suspending agents of this invention have also been used with great effectiveness in (a) alkyd and nitrocellulose emulsions for textile printing, (b) silk screen inks (aliphatic solvent base), and (c) conventional printing inks. The suspending agents of this invention have been found to have utility in other non-aqueous fluid systems containing finely divided solid particles, such as in aluminum and other metallic paint systems, petroleum lubricating oils containing, e.g., finely divided sulfur particles, and the like.

As has been demonstrated above, the suspending agents of this invention are characterized by a number of advantages over previously available suspending agents. Thus, the suspending agents of this invention do not grain, seed, or undergo, any other unfavorable changes at high processing or storage temperatures; they are effective in both aliphatic and aromatic vehicles, requiring no special solvent for activation; they are non-yellowing, and can be used without fear of discoloration; their use permits complete control of rheological properties, prevents defective batches of finished products, and gives consistent results; they are more efficient than other available agents, as less of the instant agents is required to achieve results in high temperature processing equipment equivalent or superior to those attainable with other additives; the instant agents are inert, and do not affect the durability, rate of dry, mar resistance, adhesion, color, or washability of paint or other finishes, and have no deleterious effect on gloss initially or after aging. In addition, the suspending agents of this invention have a striking ability to impart anti-sag properties to paint and other systems. These agents are excellent pigment suspension additives, as they are capable of preventing the settling of even such materials as dense chrome and lead pigments. Effective pigment suspension can be obtained with a low or nominal amount of these agents, though a higher amount may be necessary to impart anti-sag properties. This factor is important in the case of industrial finishes applied by non-brushing methods where pigment suspension is paramount and anti-sag is secondary. The agents of this invention also contribute to the brushability of paints, and are noteworthy for their ability to control penetration or bleeding. The agents of this invention also impart thixotropic body to paint and other systems, and such body can be achieved without any perceptible increase in the viscosity of the systems.

All of the foregoing advantages are achieved by the use of the compositions of this invention which are the wax-like emulsifiable ethylene polymers described herein. In addition to the claimed compositions, the process of preparing viscosity-stable, non-settling compositions containing finely divided solids by combining the components with the agents of this invention at a temperature in the range from about 130° F. to about 180° F. is also a feature of this invention.

What is claimed is:

1. A heat-stable composition of matter, for use in modifying the rheological and suspension properties of non-aqueous fluid systems containing finely divided solid particles, which consists of a dispersion in an organic liquid vehicles compatible with paint of finely divided water emulsifiable polyethylene wax having a melting point between about 208° F. and about 221° F., penetration hardness between about 1 and about 6, acid number between about 2 and about 50, and saponification number between about 9 and about 25, said composition being water-free, and said vehicle being in an amount ranging from about 40 to about 95 wt. percent, based on the weight of the total composition.

2. The composition of claim 1, in which the wax has acid number between about 7 and about 50, 3. The composition of claim 1, in which said vehicle is selected from the group consisting of aliphatic cycloaliphatic, aromatic and terpene hydrocarbons.

4. A water-free composition of matter comprising an organic liquid vehicle compatible with paint and in an amount ranging from about 40 to about 95 wt. percent, based on the weight of the total composition, finely divided solid pigment particles distributed therethrough and stably suspended therein, and a heat-stable rheological modifying and suspending agent dispersed therein, said agent comprising finely divided water-emulsifiable polyethylene wax having a melting point between about 208° F. and about 221° F., penetration hardness between about 1 and about 6, acid number between about 2 and about 50, and saponification number between about 9 and about 25.

5. A paint composition comprising an organic liquid film-forming vehicle, finely divided pigment dispersed in said vehicle, and finely divided water-emulsifying polyethylene wax dispersed in said vehicle, said wax having melting point between about 208° F. and about 221° F., penetration hardness between about 1 and about 6, acid number between about 2 and about 50 and saponification number between about 9 and about 25, said composition being substantially water-free and containing from about 1 to about 30 lbs. of said wax per 100 gallons of total composition.

6. The process of preparing an agent for incorporation into a paint composition for providing a viscosity-stable, non-settling paint composition which comprises dispersing finely divided pigment solids and finely divided water-emulsifiable polyethylene wax having melting point between about 208° F. and about 221° F., penetration hardness between about 1 and about 6, acid number between about 2 and about 50, and saponification number between about 9 and about 25, in an organic liquid vehicle at a temperature in the range from about 130° F. to about 180° F., said agent being water-free and said vehicle being compatible with the paint composition and ranging in an amount from about 40 to about 95 wt. percent, based on the weight of the total agent.

7. The process of claim 6, in which said wax has acid number between about 7 and about 50.

8. The method of improving the rheological properties of a paint product which comprises proportionately adding to 100 gallons of the paint product from about 1 pound to about 30 pounds of a water-emulsifiable polyethylene wax dispersed in colloidal dispersion in an organic liquid vehicle compatible with the paint product, in the absence of water.

9. The process of claim 8, wherein said wax comprises from about 5% to about 60% of the weight of the wax-vehicle dispersion.

10. A paint composition comprising a colloidal dispersion of a water-emulsifiable polyethylene wax in a liquid organic hydrocarbon paint vehicle in the absence of water, said vehicle being film-forming, said wax being present in an amount of between about one pound and about 30 pounds per 100 gallons of the total paint composition.

11. A paint composition comprising an organic liquid film-forming vehicle in an amount ranging from about 40 to about 95 wt. percent, based on the weight of the total composition, finely divided pigment dispersed in said vehicle, and finely divided water-emulsifying polyethylene wax dispersed in said vehicle, said wax having melting point between about 208° F. and about 221° F., penetration hardness between about 1 and about 6, acid number between about 2 and about 50 and saponification number between about 9 and about 25, said composition being substantially water-free.

12. The process of imparting improved rheological properties to a paint composition containing a film-forming vehicle which comprises proportionately incorporating into 100 gallons of said paint composition in finely dispersed form from about one pound to about 30 pounds of a finely divided water-emulsifiable polyethylene wax having melting point between about 208° F. and about 221° F., penetration hardness between about 1 and about 6, acid number between about 2 and about 50 and saponification number between about 9 and 25, said composition being substantially water-free.

References Cited in the file of this patent

UNITED STATES PATENTS

| | | |
|---|---|---|
| 2,589,069 | Fasce | Mar. 11, 1952 |
| 2,599,119 | McQueen | June 3, 1952 |
| 2,599,123 | Pinkney | June 3, 1952 |
| 2,628,214 | Pinkney | Feb. 10, 1953 |
| 2,766,214 | Erchak | Oct. 9, 1956 |
| 2,770,555 | Cornwell | Nov. 13, 1956 |
| 2,772,982 | Vesce | Dec. 4, 1956 |
| 2,823,200 | Longley | Feb. 11, 1958 |
| 2,902,376 | Beacher et al. | Sept. 1, 1959 |

OTHER REFERENCES

Albin H. Warth: Chemistry and Technology of Waxes, Reinhold, New York, 2nd ed., 1956, pp. 446–7, 499 and 533.